July 5, 1966  R. D. BRADLEY ET AL  3,259,052
COMBINED LIGHTING AND AIR HANDLING APPARATUS
Filed Aug. 8, 1963  9 Sheets-Sheet 1
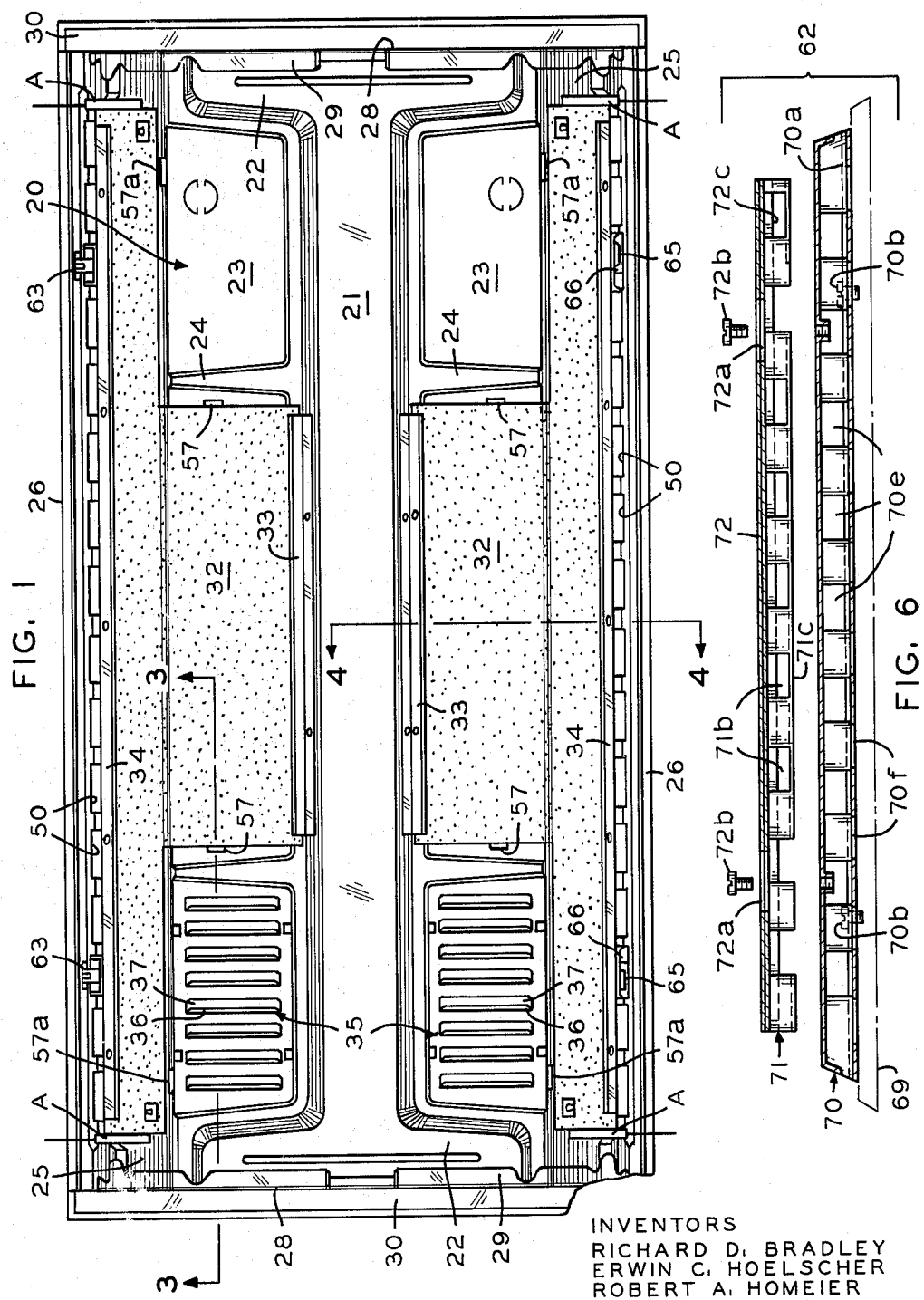
INVENTORS
RICHARD D. BRADLEY
ERWIN C. HOELSCHER
ROBERT A. HOMEIER
MURRAY L. QUIN
IRVIN J. SCHEVELING
BY Gravely, Lieder & Woodruff ATTYS.

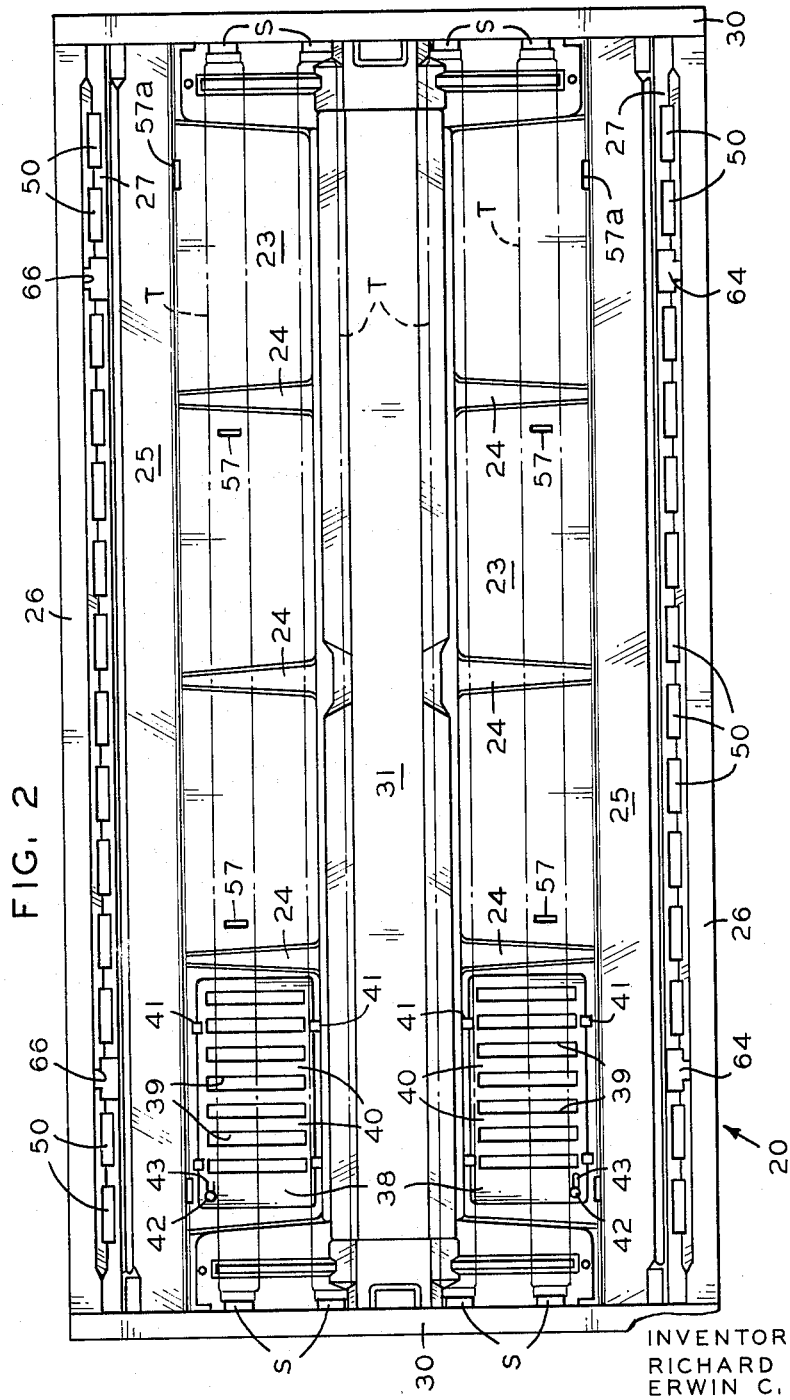

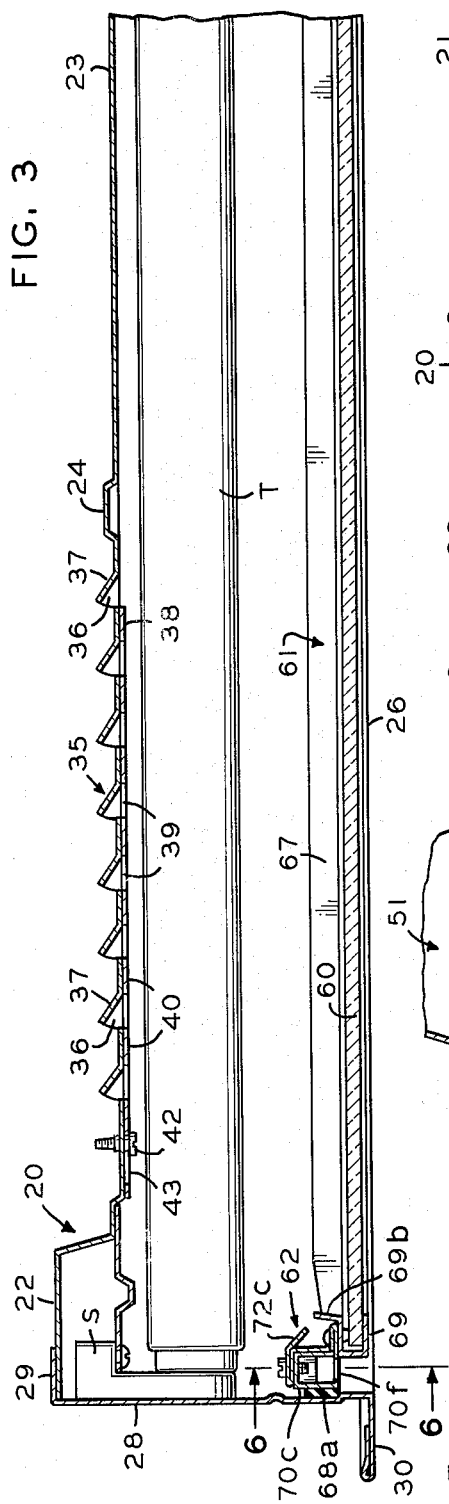

INVENTORS
RICHARD D. BRADLEY
ERWIN C. HOELSCHER
ROBERT A. HOMEIER
MURRAY L. QUIN
IRVIN J. SCHEVELING
BY Gravely, Lieder & Woodruff ATTYS July 5, 1966  R. D. BRADLEY ET AL  3,259,052
COMBINED LIGHTING AND AIR HANDLING APPARATUS
Filed Aug. 8, 1963  9 Sheets-Sheet 5
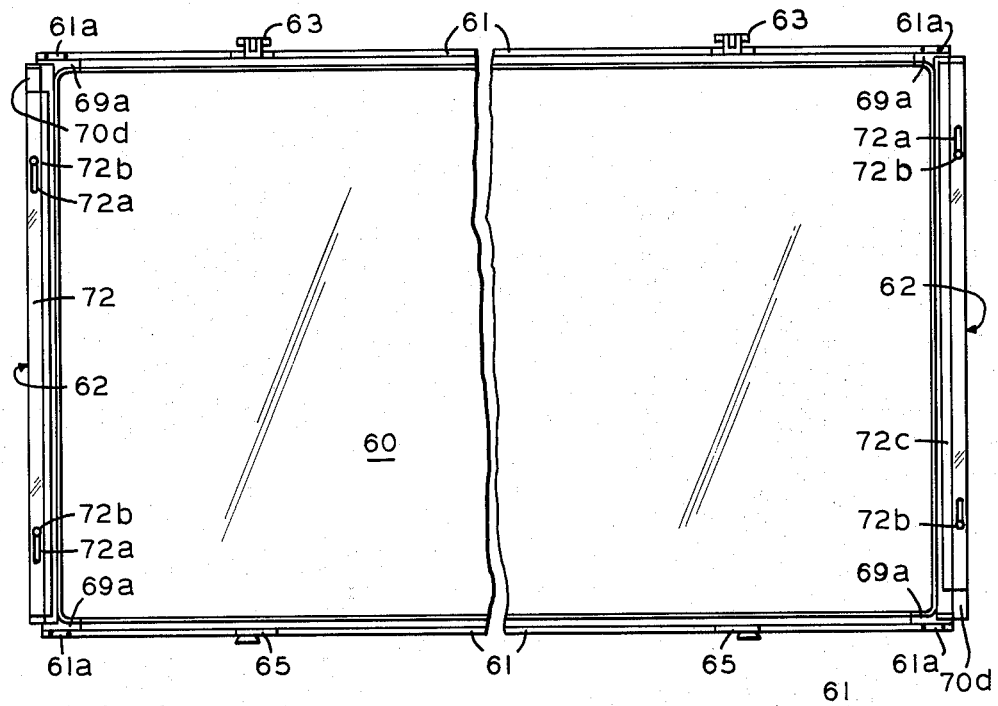
FIG. 8
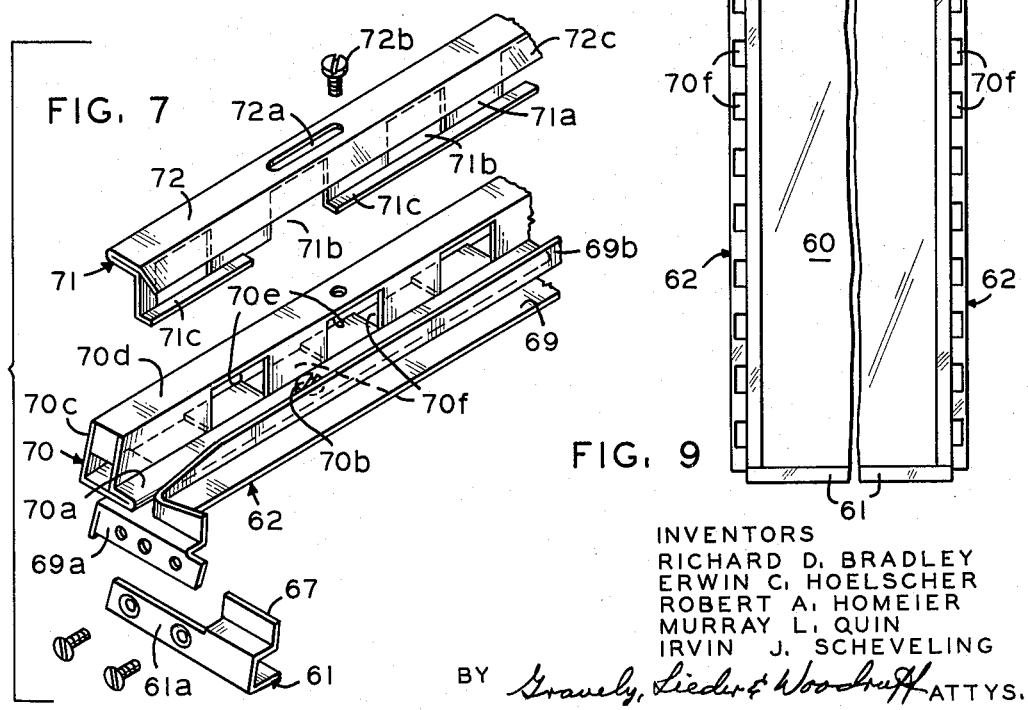
FIG. 7
FIG. 9
INVENTORS
RICHARD D. BRADLEY
ERWIN C. HOELSCHER
ROBERT A. HOMEIER
MURRAY L. QUIN
IRVIN J. SCHEVELING
BY Gravely, Lieder & Woodruff
ATTYS.

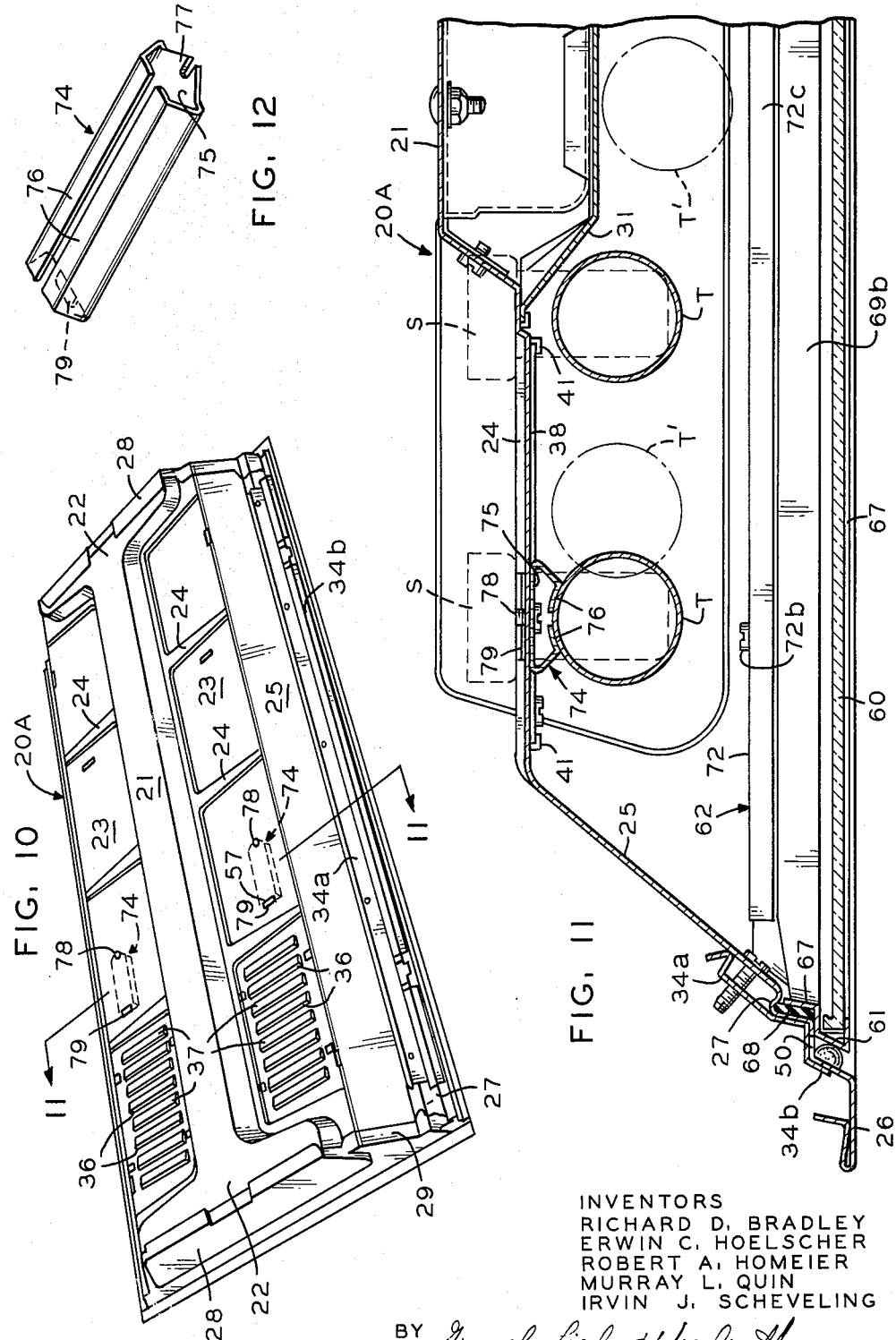

July 5, 1966  R. D. BRADLEY ET AL  3,259,052
COMBINED LIGHTING AND AIR HANDLING APPARATUS
Filed Aug. 8, 1963  9 Sheets-Sheet 7

INVENTORS
RICHARD D. BRADLEY
ERWIN C. HOELSCHER
ROBERT A. HOMEIER
MURRAY L. QUIN
IRVIN J. SCHEVELING
BY Gravely, Lieder & Woodruff ATTYS.

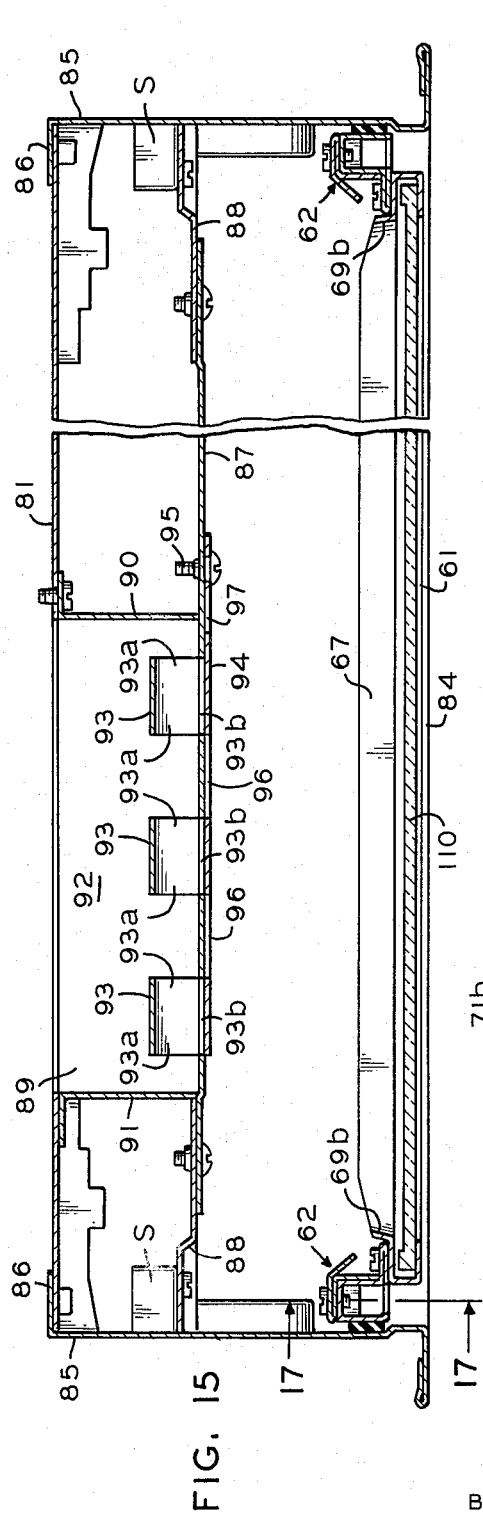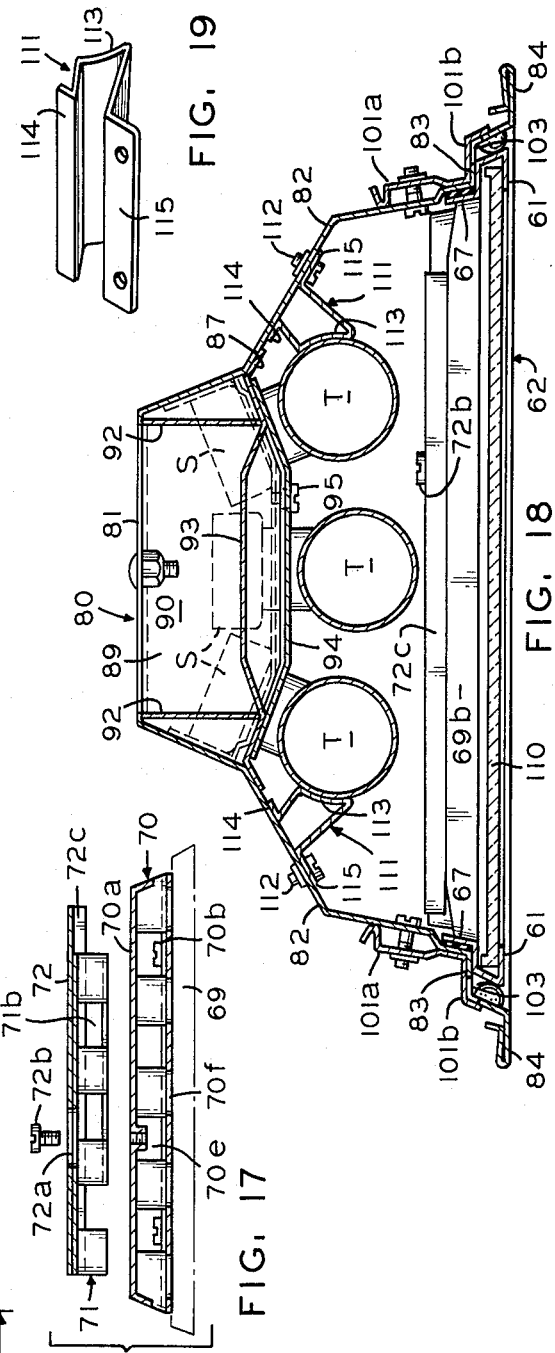
INVENTORS
RICHARD D. BRADLEY
ERWIN C. HOELSCHER
ROBERT A. HOMEIER
MURRAY L. QUIN
IRVIN J. SCHEVELING
BY *Gravely, Lieder & Woodruff* ATTYS.

July 5, 1966　　　R. D. BRADLEY ET AL　　　3,259,052
COMBINED LIGHTING AND AIR HANDLING APPARATUS
Filed Aug. 8, 1963　　　　　　　　　　　　　9 Sheets-Sheet 9

INVENTORS
RICHARD D. BRADLEY
ERWIN C. HOELSCHER
ROBERT A. HOMEIER
MURRAY L. QUIN
IRVIN J. SCHEVELING
BY Gravely, Leeder & Woodruff ATTYS.

United States Patent Office 3,259,052
Patented July 5, 1966

3,259,052
COMBINED LIGHTING AND AIR HANDLING APPARATUS
Richard D. Bradley, Glendale, Erwin C. Hoelscher, Crestwood, Robert A. Homeier, Arnold, Murray L. Quin, Overland, and Irvin J. Scheveling, Affton, Mo., assignors to Emerson Electric Co., a corporation of Missouri
Filed Aug. 8, 1963, Ser. No. 300,806
12 Claims. (Cl. 98—40)

This invention relates to combined lighting and air handling apparatus and is particularly directed to improvements in fluorescent lighting apparatus.

At the present time lighting fixtures are being employed more and more for handling ventilating air supply and exhaust air flow. As fluorescent lighting fixtures have a reasonable size, it has been found that a lighting system composed of a number of these fixtures may be adequate for handling the ventilating air supply and exhaust air of the room or area lighted thereby. In a great many instances not all of the fixtures are needed to handle the air flow requirements so that some fixtures are inactive in the respect that they are not called upon, in addition to illumination, to handle any air flow to or from a given room or space.

In connection with the use of enclosed fluorescent lighting fixtures for handling air flow for ventilating or air conditioning rooms or other areas, it has been found that the fixtures handling air have a color difference in comparison to fluorescent lighting fixtures which do not handle air. In other words, in a room area lighted by a number of fluorescent lighting fixtures, some of which handle air and some of which do not, the non-air handling fixtures have a whiteness color characteristic and the air handling fixtures have a pinkish or yellow-white color characteristic. Tests have been made on this color condition and it has been discovered that the color characteristic is due to the lower temperatures at which the fluorescent lamps operate in the fixtures handling air. It has also been discovered that the lower operating temperature of the fluorescent lamps produces a higher light output or percentage of lumens.

While the air handling fixtures have the resulting advantages of combining area illumination and ventilation, the color difference produced between air handling and non-air handling fixtures is objectionable, especially in that the fixtures which produce higher light output do not have the "fresh" appearance of the whiter non-air handling fixtures. The ideal condition, of course, is to have all of the fixtures appear in color harmony while not substantially altering the operation of any of the fixtures, and not requiring the use of lenses which are substantially color matched only when the fluorescent lamps are lighted. If color matched lenses of this character are used with the lamps lighted, the unlighted lenses will usually appear to be unmatched, so the problem is not overcome in this manner.

After considerable experimentation, it has been found that the same fixtures adapted to handle the air exchange with a room or other area could be used as the non-air handling fixtures by making certain simple alterations in the assembly so that the fluorescent lamps would operate at lower temperatures to substantially match the performance of the lamps in the air handling fixtures. In the testing it was found that by providing vent openings in the top or back wall or walls of the fixture body and by "cold spotting" the lamps, the non-air handling fixtures could be brought into substantially color matching performance with the air handling fixtures. In order to bring the color matching even closer, the air handling fixtures were provided with thermal insulation adjacent the exterior surfaces of the reflector walls of the fixture. As a result, lamps in the air handling or active fixtures operated nearer their expected color, and the lamps in the non-air handling or static fixtures operated in a similar color matching manner.

Accordingly, a principal object of this invention is to overcome the foregoing stated and other objections in the performance of active air handling fixtures and non-air handling static fixtures.

It is an important object of this invention to provide a substantially standard structure for fluorescent lighting fixtures, and to provide certain accessory means therefor suitable for obtaining color matching characteristics between air handling and non-air handling fixtures in a group of fixtures for lighting and ventilating a given room or area.

It is an object of this invention to provide simple means for obtaining color matching performance by non-air handling lighting fixtures, when in a group with air handling fixtures, by intentionally altering the operating color of the lamps so that there is a basis in such fixtures for color matching.

Other objects of this invention, and the attendant advantages, reside in the parts, components, and sub-assemblies which are hereinafter disclosed or described in certain preferred forms which the structure may have, as well as in connection with equivalent forms which may not be specifically shown in the accompanying drawings, wherein:

FIG. 1 is a plan view of a lighting fixture body, as seen from the top or back side, in which certain of the features of the present invention have been omitted for clarity of disclosure, reference being directed to FIG. 5 for the omitted portions;

FIG. 2 is a plan view of the lighting fixture in FIG. 1 as seen from the underside or light emitting face with the usual enclosing panel removed;

FIG. 3 is a fragmentary longitudinal sectional elevational view taken at line 3—3 in FIG. 1;

FIG. 4 is a fragmentary transverse sectional elevational view taken at line 4—4 in FIG. 1;

FIG. 6 is a sectional elevational view taken at line 6—6 in FIG. 3, showing certain parts in exploded relation to better illustrate the details thereof;

FIG. 7 is a fragmentary and exploded perspective view of the parts of FIG. 6 showing further details thereof;

FIG. 8 is a plan view of a panel enclosure and frame assembly of the present invention in which the device of FIGS. 6 and 7 is incorporated;

FIG. 9 is a plan view, with a central portion removed, of the reverse side of the panel enclosure and frame of FIG. 8;

FIG. 10 is a perspective view from the top or back side of a lighting fixture adapted for cold spotting of the lamps and is hereinafter referred to as an inactive or non-air handling fixture;

FIG. 11 is a fragmentary transverse sectional elevational view taken at line 11—11 in FIG. 10;

FIG. 12 is a perspective view of a cold spoting device such as is shown in FIG. 11;

FIG. 15 is a longitudinal sectional elevational view, with a portion broken out, of the fixture body of FIG. 14, the section being taken at line 15—15 therein;

FIG. 17 is a sectional elevational view taken at line 17—17 in FIG. 15 showing certain parts in exploded relation;

FIG. 18 is a transverse sectional elevaional view of the fixture similar to that shown by FIG. 16, but modified for service as an inactive non-air handling fixture;

FIG. 19 is a perspective view of a cold spotting device employed in the fixture of FIG. 18.

Figure 5:
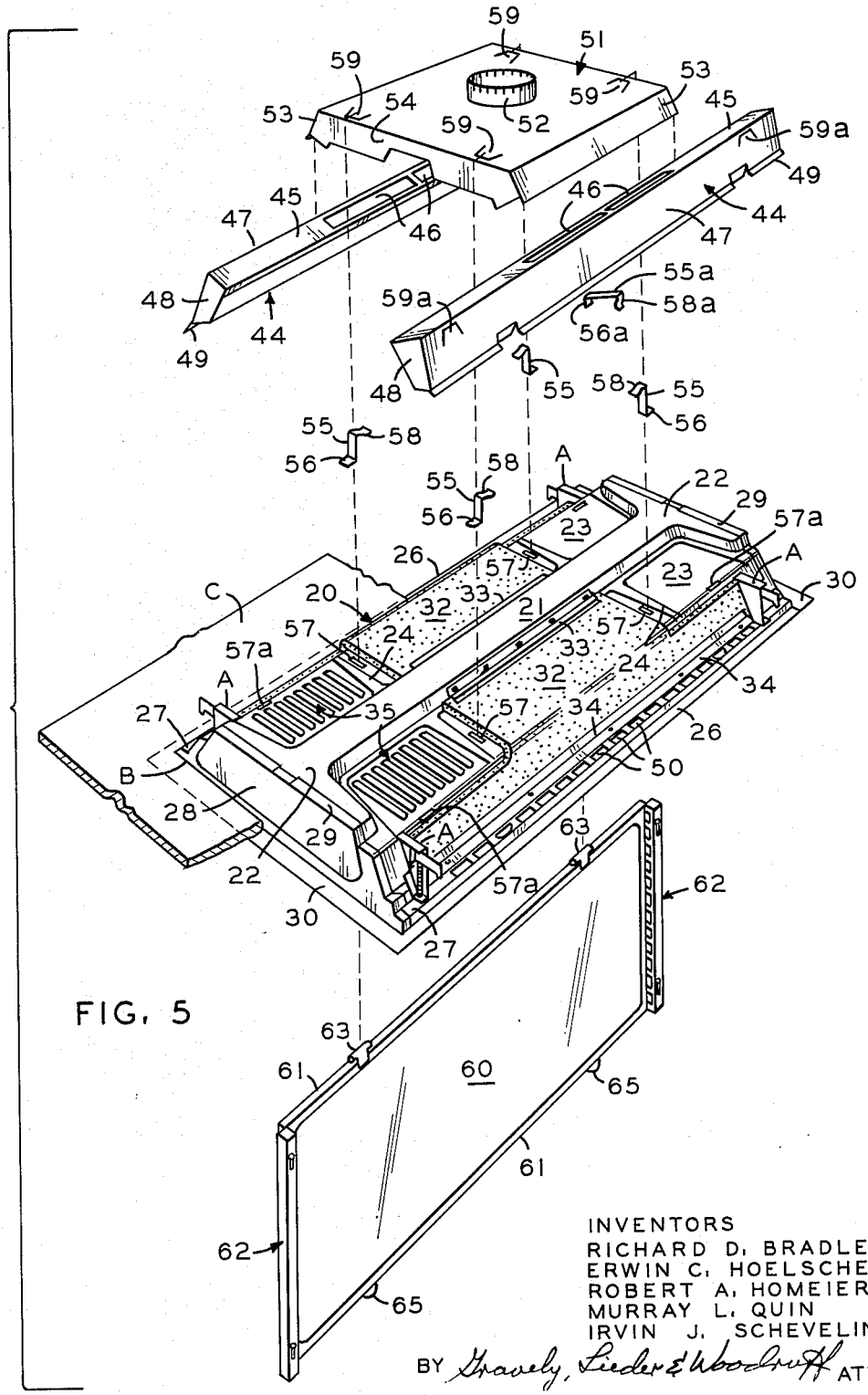
FIG. 5 is an exploded perspective view of the several components of a lighting fixture adapted to handle ventilating air, and when so assembled is hereinafter referred to as an active air handling fixture.

One form of the fixture may be seen in FIGS. 1, 2, 3, 4 and 5, and includes a troffer body 20 having a longitudinal channel portion 21 and opposite enlarged end cavities 22, together constituting an elongated I-shaped backbone structure which is raised above the plans of the back wall 23. The back wall 23 is formed with laterally extending ribs 24 spaced apart, there being a plurality of such ribs on each side of the longitudinal channel 21 (FIG. 2). In the present fixture three ribs 24 on each side have been shown. The back wall 23 joins downwardly and outwardly sloping side walls 25 (see FIG. 4), and each side wall is formed with a marginal flange 26 joined to the side wall by a stepped flange portion 27 which is inwardly and upwardly recessed in relation to the plane of the flange 26. The opposite ends of the body 20 are closed by caps 28 having attaching flange 29 thereon (FIG. 5). Each cap has a flange 30 which with the side wall flanges 26 comprise the face frame for the fixture. In general, this body 20 is similar to the body disclosed in Des. 185,980 issued to Leo G. Stahlhut and Carl X. Meyer on August 25, 1959.

The fixture body 20 is shown adapted to mount four fluorescent lamp tubes T (FIG. 2) each being suitably supported in socket devices S as indicated in FIGS. 2, 3 and 4. In certain fixtures more than two lamps tubes may be used, these being located in the positions shown in broken lines at T′ in FIG. 4. The electrical wiring has been omitted, but may be conveniently enclosed in the longitudinal channel 21 behind a closure 31 (FIGS. 2 and 4). As shown in FIGS. 1 and 5, the fixture body 20 is secured in a ceiling in recessed position, or in a suspended type ceiling C, by means of supporting members A, the details of which are not pertinent to this invention. When so disposed the flanges 26 and 30 abut the margins of an opening B in the ceiling C, the ceiling being shown only fragmentarily in FIG. 5, so that the area below the ceiling is illuminated and most portions of the fixture are hidden from view above the ceiling space whch constitutes a plenum chamber.

In FIGS. 1, 4 and 5, the body 20 is shown with thermal insulation in the form of spaced batts 32 which have central portions extending outwardly from each side of the longitudinal channel 21 intermediate the enlarged ends 22 to above the sloping side walls 25. Each batt 32 has an elongated portion which extends lengthwise of the adjacent side wall 25 to near the ends thereof, and the lower margin of such elongated portion lies adjacent the upper surface of the stepped flange portion 27. A suitable clamp bar 33 secures the upper margin of the batts 32 to the channel 21, and another clamp bar 34 secures the lower elongated margin of each of the batts to the side walls 25 (see FIG. 4). The insulation batts may comprise material in which two plies of 1/8″ corrugated material are contained between covering material having several plies. Another insulation batt material may comprise a 1/4″ corrugated ply having inner and outer skins. Insulative fibreglass and foil may also be employed. In the drawings, the insulation batts are shown in the latter mentioned form.

The fixture body 20 is formed with air flow vents 35 in the top or back wall 23 near one end (FIG. 1) such that a plurality of open slits 36 are formed by outwardly displacing portions 37 of the wall material. The slits 36 open through the light reflective surface of the back wall 23 and are suitably controlled by adjustable damper plates 38 (FIGS. 2 and 4) having slots 39 therein separated by solid portions 40. The plates 38 are constructed such that the slots 39 may register with the slits 36 when the vents are open, and the solid portions 40 may cover the slits 36 when the vents are closed. Each damper plate 38 is slidably mounted in guide elements 41 (FIGS. 2 and 4), and an adjustment holding element 42 is engaged in the wall 23 with its shank received in a slot 43 in the damper plate 38 (FIG. 2).

When the fixture body is to be used as an active fixture for air handling, such as for air conditioning or ventilating purposes, the area of the back side of the body 20 covered by the insulation batts 32 is provided with air directing conduit means, as in FIGS. 4 and 5. The conduit means includes side units 44 which are made up of a top wall 45 having openings 46 therein, side walls 47 and end walls 48. The side walls 47 have lower marginal lips 49 which are adapted to abut the respective body flanges 26 at the recessed portion thereof (FIG. 4) and extend along such flange to enclose a series of slots 50 which are provided in the horizontal portion of the stepped flange 27. At the same time, the end walls 48 engage the insulation and seal the edges thereof, and the same is true for the inner margins of the top wall 45 where such margins extend endwise or longitudinally from the central openings 46 in the top wall, whereby air flow is directed from the top air inlet unit 51 of the air directing means into the side units. The inlet unit 51 has an air supply inlet connector 52 in its top wall, depending side walls 53 which extend down and lap over the wall 47 to enclose openings 46, and end walls 54 which have the marginal contour shown in FIG. 5. This air directing means is adapted to fit down into the insulation batts, and has its end walls sealed by the insulation. A bottom wall is, therefore, not needed, but may be used if the insulation is not desirable for the bottom of the air directing means.

The side units 44 of the air directing means are first secured in any convenient manner along the margin at lip 49, and the air inlet unit 51 is disposed over the top and secured by clips 55, each of which has an angled foot 56 adapted to fit into a slot 57 in the wall surface 23 and a hold down finger 58 at the opposite end to engage in an embossed seat 59 in the top surface (FIG. 5) of the unit 51. In addition to the holding action of the air inlet unit 51 on the side units 44, the side units 44 (FIG. 5) are secured adjacent the outer ends by clips 55a (one being shown in FIG. 4), each having an angled foot 56a which fits (or hooks) into slot 57a formed in the surface 23 of the fixture body 20, and a holding finger 58a which engages in an embossed seat 59a in the side wall 47. The securing of the air inlet unit 51 also acts to hold the side units 44 so that a substantially air tight joint is made between the parts 44 and 51. It will thus be appreciated that the insulation batts 32 form the inner surfaces of the air passages defined by the side units 44 and the inlet unit 51, and the batts also shield the lamp chamber inside the body 20 from the effects of cold air flow. It is also appreciated that the insulation reduces thermal exchange between the air passage and the lamp chamber, whichever way the heat exchange process goes.

Turning now to FIGS. 3, 4, 5, 7 and 8, it can be seen that the lamp chamber is closed at the plane of the marginal flanges 26 and 30 by the assembly of a transparent closure panel 60 supported in a frame having longitudinal rails 61 and transverse rails 62. One rail 61 carries hinge elements 63 which detachably mount in key-hole apertures 64 in the body 20, as seen in FIG. 2. The opposite rail 61 supports spring latches 65 which engage (FIG. 1) in holding means 66 to retain the panel in closed position. The longitudinal rails 61 have an inwardly and upwardly extending lip 67 (FIG. 4) which cooperates with the stepped portion 27 of the flange 26, and a seal or gasket 68 is engaged thereby to block substantial air leakage.

The transverse rails 62 of the lamp chamber closure not only provide a lip 69 on which the panel 60 rests, but each includes a controllable valve having a stationary part 70 fixed to the rails 61 and a movable shutter 71 slidable on the part 70. As seen in FIGS. 6 and 7, the part of the rail 62 which has lip 69 thereon is associated with end attachment brackets 69a which connect with securing extensions 61a on the side rails 61. The other part of the rail 62 includes the stationary part 70 in the form of a box section with a lip 70a held by screw elements 70b. The box portion of the part 70 has a closed outer wall 70c, top wall 70d, and an inner wall formed with a series of spaced openings 70e which are off-set relative to a series of spaced openings 70f in the lower wall. The valve shutter 71 has a wall 71a with spaced openings 71b, some of which openings are partly defined by a strengthening rib 71c. The wall 71a is at an angle to the top wall 72 in which the slot 72a is formed for the shutter holding element 72b. The shutter also is provided with an overhanging margin or shade 72c which cooperates with the flange 69b (FIG. 3) on the rail to block light leakage to the outside when the shutter is slidably adjusted relative to the stationary part 70, so that the openings 71b register with openings 70e and allow air flow communication. As shown in FIG. 3, the outer wall 70c of the stationary part 70 cooperates with a seal or gasket 68a so that air movement must be through the off-set openings 70f and 70e in the stationary part 70 when the shutter 71 is moved to have openings 71b register with openings 70e. In FIG. 9, the panel 60 has been shown from the outside face which is reverse to FIG. 8, and it shows the side which is normally viewed from below so that the openings 70f can be seen.

It can be appreciated from FIGS. 3, 6 and 7 that the rails 62 constitute controllable valves in which the air moves upwardly to the openings 70f, then moves horizontally and laterally in the stationary part 70 to the openings 70e where it must again change direction to enter the lamp space between the flange 69b and the shade 72c. The changes in direction of the air flow cause a substantial amount of dirt, dust, and entrained foreign matter to be thrown out before it reaches the interior of the fixture. This action of the valve greatly aids in reducing the collection of dirt and foreign matter upon the inner surface of the transparent panel 60 where it would normally be expected to be deposited. Since the panel is transparent such collections on the panel would create unsightly areas, but the present valve substantially reduces this effect and extends the periods of fixture use between cleaning operations. The matter collected in the valve box section 70 may be easily removed by removal of the part 72, or the parts 70 and 72 may be removed from the rail part 69 when the panel is hinged down to the position indicated in FIG. 5.

Turning now to FIGS. 10, 11 and 12 there is shown a non-air handling fixture having a body 20A which is very similar to the fixture shown in FIG. 5, but with certain modifications which will now be pointed out. Wherever parts and structure are similar to those described hereinbefore for fixture 20, similar reference numerals will be used. The fixture body 20A is the same as in FIG. 5, but with the insulation batts 32 removed. The body 20A has the ribs 24 projecting outwardly from the longitudinal channel 21' and channel 21 terminates in end enlargements 22 for the socket members S which support the lamps T. The end caps 28 enclose the body and complete a lamp chamber which opens downwardly to the room space. As was previously pointed out, the side flanges 26 have stepped flange portions 27 in which are formed a series of slots 50 opening from the face side of the body adjacent the side rail 61 of the enclosing panel 60 to the space above the ceiling C. In the non-air handling fixture the slots 50 are rendered inoperative by applying a modified bar 34a in place of the bar 34 (FIG. 4) which retains the insulation batt 32. The modified bar 34a has a suitable flange 34b which covers the slots 50, and in practice the bars may be made up with the flange 34b, and by breaking off the flange 34b the bar is converted to the form shown in FIG. 4. The frame for the closure panel 60 includes the transverse rails 62 which incorporate the movable valve shutter 72 seen in FIG. 11, but it is now in the closed position so that no air may pass through the valve to the lamp chamber.

It can be seen now that the non-air handling fixture of FIG. 10, while being essentially constructed like the active air handling fixtures, are rendered essentially non-air handling by closing the valves in the transverse rails 62, and by closing the slots 50 in the stepped flange portions 27. Since the frame rails 61 and 62 are fitted against seals 68 and 68a (see FIGS. 3 and 4) and the closure panel 60 fits snuggly in the rails, there is practically no air leakage around the panel 60 into the lamp chamber. As a result the lamps T are operated in a closed space which becomes much hotter than the space for the lamps in the active air handling fixtures, such as in FIG. 5. The hotter lamp chamber condition changes the lamp color characteristics in the ways pointed out before. Color control, therefore, is an important feature in order to have a group of active air handling and inactive non-air handling fixtures (FIG. 20) present an overall balanced color while being intermingled. The color characteristic may be controlled by cold spotting certain of the lamps T by a shoe device 74. The shoe 74 (FIG. 12) is a preformed metallic element having a back 75 and a pair of flange shoes 76 which are yieldable and together engage on the lamp side wall adjacent one end. The device 74 is formed with a slotted end 77 which is secured (FIG. 11) by a suitable screw 78. The opposite end has an off-set tab 79 which fits into slot 57 which is provided in the top wall 23 of the fixture body for the anchors 55. The use of slots 57 for holding an end of the device 74 assures correct installation, as the same slots 57 are used to retain the clips 55 for holding the air supply unit 51. Thus, if a fixture such as 20 or 20A is to be used for conditioned air the air unit 51 must be used and the cold spotting device 74 must not be used. The air unit 51 cannot be properly secured if the device 74 has its tab 79 in the slot 57 where the hold-down clip 55 should be attached.

In the non-air handling fixture of FIG. 10, the two outermost lamps are cold spotted (one being seen in FIG. 11) adjacent the end of the chamber where the vent slots 36 are provided. The slots 36 are opened by sliding the damper plate 38 to its open position, as shown in FIG. 3. The presence of the devices 74 and the opened vents 36 produces sufficient cooling to cause the lamps T to operate in approximately the same color range as the lamps T in the active air handling fixtures. The venting alone does not accomplish the desired results. The simplest way found to attain the desired end is by a cold spotting device 74, in combination with the open vents 36.

Figure 16:
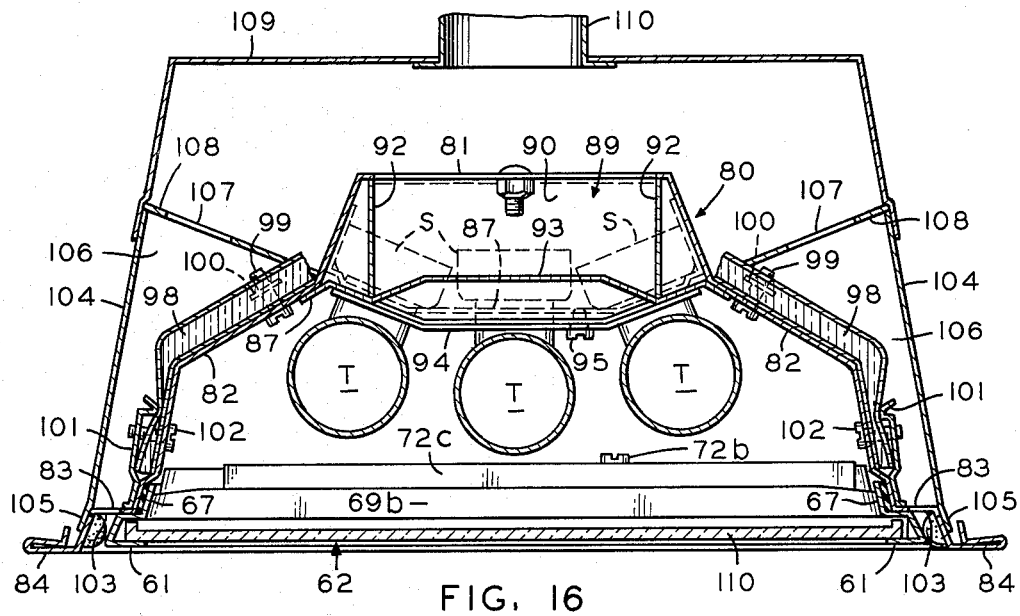
FIG. 16 is a transverse sectional elevational view taken at line 16—16 in FIG. 14.

In FIGS. 13, 14, 15, 16 and 17 there is shown a different type of recessed lighting fixture 80 compared to the fixture 20 in FIGS. 1, 2 and 4, or fixture 20A in FIGS. 10 and 11. As shown, fixture 80 has a closed back formed by the top channel 81 and the sides 82 which respectively terminate in a stepped recessed flange 83 and a face flange 84. Suitable end caps 85 are attached by flanges 86. In the view of FIG. 16, the fixture 80 encloses three fluorescent lamp tubes T, each carried by suitable sockets S, although there may be two or more lamps. The top channel 81 behind the lamps T is closed by a plate 87 supported at its opposite end by bracket members 88. Near one end of the fixture 80 the top channel 81 is interrupted by the recess 89 defined by the end walls 90 and 91 (FIG. 15) and the side walls 92 which extend inwardly to meet the plate 87. The plate 87 within the longitudinal extent of the recess 89 is formed with transverse cuts which frees strip portions 93 of the material to be bent out of the surface of the plate 87 to form two lateral openings 93a for each strip portion 93. The resulting slots 93b formed in the plate 87 are controlled by a sliding damper plate 94 which is secured by a suitable screw element 95 such that the slots 96 in the plate 94 open two of the slots 93b and the end uncovers the third slot 93b, or such that the plate 87 has its solid portions covering over the slots 93b. The motion of plate 94 is limited by the length of the slot 97 which receives the screw 95.

Figure 14:
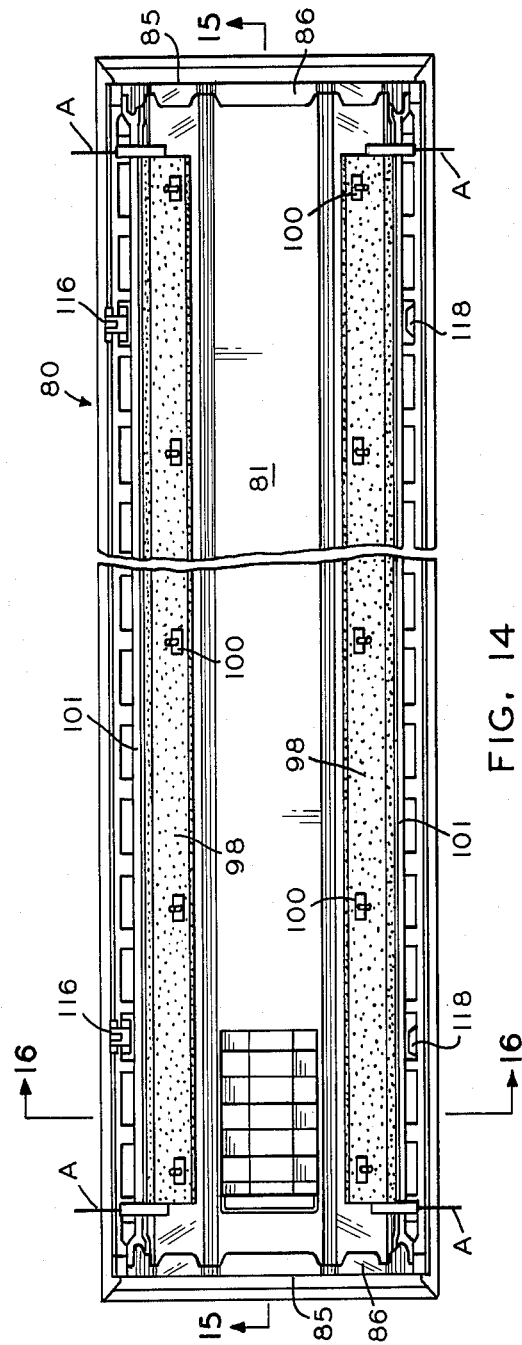
FIG. 14 is a plan view of the fixture body of FIG. 13, as seen from the top or back side.

Referring to FIGS. 14 and 16, the fixture 80 when used as an air handling unit is provided (as previously described) with insulation batts 98 extending over the side walls 82, as shown. The batts 98 are secured in place by a plurality of screw elements 99 engaged in sheet metal nut elements 100, and by elongated clip bars 101, the bars 101 being located along the lower margins of walls 82 and held by screw elements 102. The bars 101 are similar to bars 34 in FIG. 4 and uncover the slots 103 provided in the flanges 83. As seen in FIG. 16, the fixture 80 is provided with side units 104, similar to the units 47 in FIG. 5, and each unit 104 has a lower lip 105 which encloses the slots 103. The units 104 have end walls 106 which generally conform to the contour of the side walls 82 and engage against the insulation batts 98 as a seal so that air flow in the units is constrained to pass through the slots 103 and also through slots 107 in the upper slanting wall 108. The respective units 104 are connected by an air directing unit 109 similar to unit 51 in FIG. 5, and an air connection collar 110 is carried by the unit 109. Although not shown in FIG. 16, the units 104 and unit 109 may be secured in place by clip means as shown in FIG. 4, or by equivalent means.

In FIGS. 15, 16 and 17, the fixture 80 is provided with an enclosure panel 110 mounted in a frame having longitudinal rails 61 with upwardly extending lips 67, and also having transverse rails 62 formed with extended flanges 69b. Each transverse rail 62 includes a valve assembly similar to the valve assembly shown in FIG. 7, and like reference numerals are applied to like parts in both disclosures for brevity of description. The valve assemblies in the rails 62 may be adjusted so that air from the room space may flow into the lamp chamber from either or both ends of the fixture 80 such air collecting the lamp heat for exhaust at the slots 93b.

As may be seen in FIG. 16, the fixture 80 is adapted to handle air supply to the room or occupied space through the unit 109 and side units 104, while other room air flows through the valves in rails 62 (one or both) into the lamp chamber and out through the slots 93b and recess 89 (FIG. 15). In this application the fixture 80 functions as an active air handling unit for either air supply or air supply and lamp heat exchange, and the air supply is insulated from the lamp chamber by the batts 98 along the side walls 82. The longitudinal structure 81, except for the recess 89, provides a substantially dead air insulating space in conjunction with the interior closure plate 87.

The fixture 80 of FIG. 16 may be modified to function as an inactive non-air handling fixture, and reference will now be made to FIGS. 18 and 19. As shown in FIG. 18, the fixture 80 is modified by eliminating the insulation batts 98 and rails 101 and substituting modified rails 101a in which flanges 101b serve to close off the slots or openings 103 in the side flanges 83. The side units 104 and air directing unit 109 are removed, and the valves in rails 62 are closed by suitably adjusting the shutter means 71. The damper plate 94 is opened so that the lamp heat may flow out at slots 93b. In order to effect the desired color matching heretofore described, cold spotting devices 111 are secured to the side walls 82 by screw elements 112. Each device 111 (FIG. 19) is formed with a lamp contacting surface 113 and spaced legs 114 and 115, the leg 115 being fixed by the screws 112, while leg 114 is free to yield so that excessive pressure on the lamps T is avoided. In the fixture 80 of FIG. 18 the two outer lamps T are cold spotted at the ends nearest the recess 89.

Figure 13:
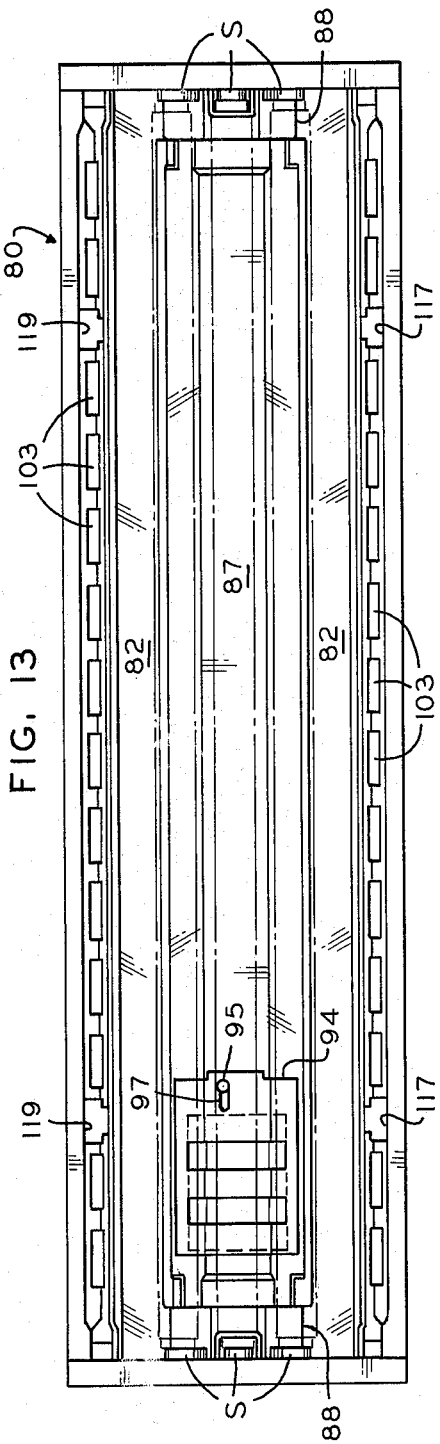
FIG. 13 is a plan view of a modified lighting fixture body, as seen from the light emitting side with the enclosing panel removed, in which certain of the features of the present invention are disclosed, and will be hereinafter referred to as an active air handling fixture.

As shown in FIG. 14, the enclosure panel 110 (which is on the opposite side) is secured to the fixture body 80 by hinge means 116 on one side rail 61 engaging in a key-hole aperture 117 (see FIG. 13), and by latch elements 118 on the opposite side rail 61 engaging in key-hole apertures 119 (see FIG. 13). The mounting of these parts is similar to that shown and described in connection with FIGS. 1, 5 and 8. In FIG. 14 there is shown mounting means A by which the fixture body 80 may be releasably disposed in a suspended ceiling structure.

It can now be appreciated that the fixture body 20 of FIG. 1 or the fixture body 80 of FIG. 14 may be an active air handling unit in which conditioned air is supplied to a room space by flow around the insulated lamp chamber and through the side flanges to a room. These same fixtures may also be adapted to permit heat exchange by exhausting room air through the lamp chamber at one or both transverse valves 62 to carry off lamp heat at the slotted exhaust in the top enclosing wall of the lamp chamber. In each form of the fixture certain modifications may be made, as in FIGS. 11 or 18, to adapt the same as inactive non-air handling units, wherein cold spotting devices, such as 74 or 111, are used in conjunction with opening of the damper plates and closing of the valves in transverse rails 62 at the ends of the frame for the enclosing face panels 60 or 110. Thus, in the several forms of the present fixture the room illumination may be combined with room ventilation air conditioning, stale air exhaust by reversing the air flow in the air directing units 51 or 109, and stale air exhaust may be obtained by flow through the lamp chamber in heat exchange relation with the lamps T, or by any combination thereof.

Figure 20:
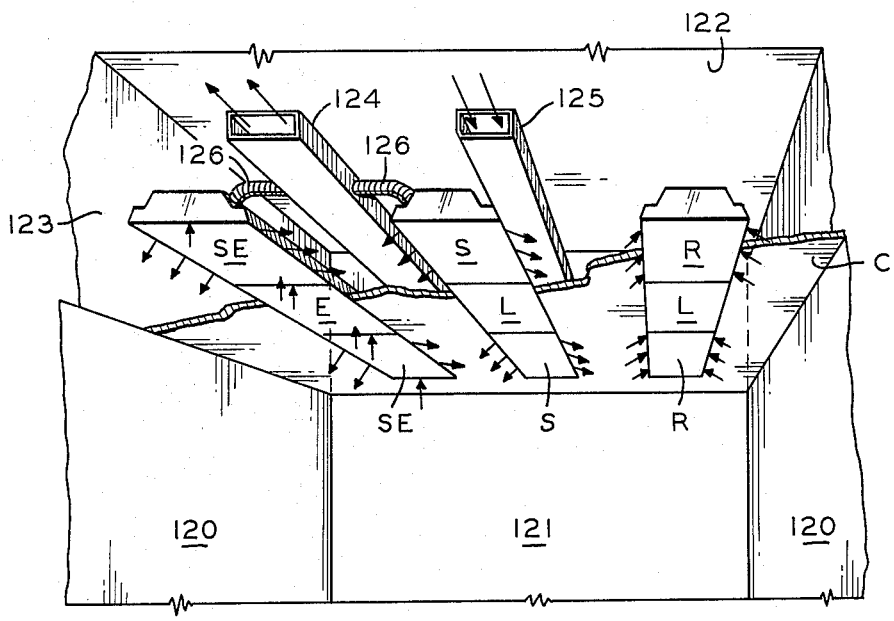
FIG. 20 is a fragmentary perspective view of a ceiling area as seen looking up from below in which a plurality of lighting fixtures are installed, certain of such fixtures being active air handling and others being inactive non-air handling as will be more particularly described.

These several functions may be intermingled in one room where a plurality of fixtures are installed in a suspended ceiling. One representative example of the intermingling of the multipurpose fixtures is disclosed in FIG. 20 and reference will now be made to that view of the drawings. The room has the usual side walls 120, end wall 121 and the ceiling 122. A suspended ceiling C is provided below the ceiling 122 so that a plenum space 123 is formed, and air ducts 124 and 125 are disposed in the plenum and are connected to circulating apparatus of conventional character. The view of Fig. 20 is schematic and shows three rows of fixtures with three fixtures in each row. However, this arrangement is illustrative only and more or less fixtures may be used and the arrangement may be varied. In the left hand row, fixtures SE are separated by the fixture E; in the middle row fixtures S are separated by the fixture L; and in the right hand row fixtures R are separated by fixture L. The letter designations refer to the service provided by the fixture. For example, fixture SE is arranged to provide air supply and exhaust, in addition to illumination. Such a fixture may be of the construction shown in FIG. 5 or 16 wherein the air duct 124 is connected by flexible conduits 126 to the collars 52 or 110 respectively. All SE fixtures would be similarly arranged so that room air would be exhausted through the lamp chamber by way of inlet valves in transverse rails 62 and outlets 36 or 93b. The exhaust air is removed from the plenum 123 by duct 125.

Fixtures E are arranged only to exhaust room air through the lamp chamber and then from the plenum by way of duct 125. Thus, no flexible conduit 126 is needed. The fixtures S are for air supply only and are connected to a flexible conduit 126 for that purpose, but the valves in transverse rails 62 are closed. The fixtures R are for returning room air to the plenum around the lamp chamber and, thus the air flows through the side units 44 or 104 and the top units 51 or 109 (see FIGS. 5 or 16 respectively), into the plenum space for exhaust at duct 125. The fixtures L are for illumination only and have no air connections as heretofore described. A fixture L is shown in FIG. 10 and in FIG. 18, and in each case the lamps T are cold spotted for the purpose previously described. In such an assembly of different types of fixtures when illumination is off the closure panels will appear all alike and have the same color. When the fixtures are illuminated, the L fixtures would appear to have a different color (more white) without the cold spotting means 74 or 111, than the color of the panels for the other fixtures SE, E, S or R. It is perhaps, unusual that all types of fixtures will be found in the one room space of FIG. 20, but the disclosure in such view has been given to illustrate the principles of the invention.

While the invention hereof has been shown and described in what is conceived to be the practical forms, it is of course understood that changes and alterations may be made therein, all within the intended scope of the invention. Therefore, the chosen forms are not to be limited to the details thereof but are to be given the full scope of the claims and so as to include any and all equivalent apparatus.

What is claimed is:

1. An assembly of lighting fixtures for a given space including in combination: at least one fixture having a body with a substantially closed back side and an opposite open said facing the given space, lamps in said body, a closure for said open side constructed with air inlet means for admitting space air into said body for exhaust, means on said body forming an outlet for escape of lamp heated exhaust air from said body, ventilating air supply means for the given space including conduit means mounted on said closed back side and having an inlet to receive ventilating air, said body including air flow means opening to said given space through said closed back side and separate from but adjacent said open side, said conduit means enclosing said air flow means and said inlet opening means for said closure being spaced from said air flow means; and at least one other fixture having a body with a substantially closed back side and an opposite open side facing the given space, lamp means in said body, a closure for said open side, means on said body forming an outlet for escape of lamp heated air from said body, and heat dissipating means in said other fixture body engaged upon said lamp means to affect the temperature of the same, whereby said assembly of fixtures have substantially the same color appearance when the lamps are on and in the presence of ventilating air and exhaust air flow.

2. An assembly of lighting fixtures for a given space including in combination: at least one fixture having a body with a back side enclosing a lamp chamber and an opposite open side facing the given space, lamp means in said lamp chamber, light permeable closure means disposed over said open side and constructed with air inlet means communicating between said given space and the lamp chamber, said back side having a lamp heated air vent opening through said back side, a limited area of said body back side having return air flow means opening from said given space to the exterior to remove air from such space in a flow path separate from the flow of air from said given space through said lamp chamber; and one other fixture having a body with a back side enclosing a lamp chamber and an opposite open side facing the given space, lamp means in said lamp chamber, light permeable closure means over said open side, said body back side having a lamp heated air vent opening from said lamp chamber and air flow means opening from said given space through the body back side outside of said lamp chamber, and heat dissipating means in said other fixture body engaged upon said lamp means to reduce the operating temperature thereof and cause said light permeable closure means to substantially match the color of said closure means in the first mentioned body.

3. In a building space ventilating and illuminating system, the building having a plenum chamber above a ceiling for the space, the combination including a first and a second lighting fixture in the ceiling, each fixture having a light emitting side facing the space and a closed back side in the plenum chamber, said back sides having a vent opening between the interior of the fixture and the plenum chamber and apertures opening between the space and the plenum chamber around the interior, fluorescent lamp means in each fixture to deliver illumination through the light emitting side, light pervious enclosure means over the light emitting side of each fixture comprising a light pervious panel and a frame therefor, said frame for the first fixture being provided with a selectively controllable air passage opening between the space and the interior of the fixture, ventilating air supply means in the plenum chamber connected to said first fixture over said apertures to deliver air therethrough for space ventilation, said first fixture having the air passage in its frame open to provide space air exhaust flow through the interior past said lamp means and out at said vent to carry off lamp heat, and fluorescent color matching means in said second fixture engaged with said lamp means to cause the lamp means therein to operate at substantially the color of the lamp means in said first fixture.

4. The combination set forth in claim 3 wherein said color matching means is metallic with a high rate of heat conductivity.

5. The combination set forth in claim 4 wherein said color matching means is engaged with said lamp means over a limited area.

6. The combination set forth in claim 5 wherein said color matching means is engaged with said lamp means at a location adjacent said vent opening.

7. The combination set forth in claim 3 wherein said ventilating air supply means includes a housing carried on said closed back side adjacent said vent, and thermal insulating means is on said back side within said housing for cooperating with said air supply means to restrict the heat exchange relationship between the supply of ventilating air and exhaust air flowing through the interior of said first fixture.

8. The combination set forth in claim 7 wherein said insulating means comprises insulating batting and said housing bears on said batting about certain of its margins as a seal against air leakage, and clip means is engaged in said first fixture and upon said housing to releasably retain said housing in position.

9. In a building space ventilating and illuminating system in which the building has a suspended ceiling defining a plenum chamber over the space, the combination which includes: a plurality of illuminating fixtures mounted in the suspended ceiling, each fixture having an open side facing the space and a back side in the plenum chamber formed with a vent opening between the interior of the fixture and the plenum chamber fluorescent lamp means in all of said fixtures, a light pervious enclosing panel at the open side of each said fixture, means connecting each panel to its own fixture; a first set of said fixtures having means on each panel thereon providing an air flow opening between the space and the plenum chamber, ventilating air supply means in the plenum chamber connected to said air flow means on said first set of fixtures to supply ventilating air to the space through said air flow openings; a second set of said fixtures having the air flow openings between the space and the plenum chamber freely open to the plenum space, means to withdraw air from the plenum chamber and cause air flow from the space through said second set of said fixtures; a third set of said fixtures having said panel connecting means provided with open passages between the space and the interior thereof to allow for the flow of air from the space through said third set of fixtures to the plenum chamber and carry off lamp heat; and lamp heat dissipating means in said second and third sets of said fixtures, said dissipating means in each of the latter fixtures being engaged with said lamp means to carry off lamp heat, said heat dissipating means causing said second and third sets of said fixtures to assume color characteristics as seen by said panels, substantially similar to the color characteristics of said panels in said first set of fixtures.

10. An air handling space lighting fixture including a first body, having a lighting chamber with an open side facing the space opposite a closed back side, a light pervious panel, frame means carrying said panel attached to said body adjacent said open side, a second body mounted on said first body adjacent said back side and comprising a ventilating air flow enclosure, said first body having ventilating air outlet means formed in a portion of said back side and said air flow enclosure being connected to said back side to enclose said ventilating air outlet means, lamp means in said lighting chamber, tortuous air flow passage means formed in said frame means comprises a frame member having a first set of openings facing the space and a second set of openings off set from the first set and opening into the lighting chamber, a flow control shutter operably mounted on said frame to control said air flow passage means, said control shutter being movable relative to said passage means and having a set of control walls matching one of said sets of openings to close and open the latter selectively upon movement of said control shutter, said first and second set of openings being angularly related to lie in different planes, whereby the direct leakage of light from said lamps is substantially cut-off from passing into the space through said passage means, and exhaust air flow vent means formed in said first body in said back side and spaced from said ventilating air outlet means while being disposed outside of said second body, said fixture thereby having ventilating air flow around said lighting chamber and lamp heated exhaust air flow through said chamber independent of said ventilating air flow.

11. The air handling lighting fixture set forth in claim 10, wherein said control shutter has a shade member thereon projecting outwardly relative to said second set of openings to further cut off the passage of light into the space.

12. In combination in building space illuminating and air exchange apparatus, a plurality of space illuminating fixture bodes having internal cavities facing the space to be illuminated, means mounting said bodies in the space, a fluorescent lamp operatively mounted in each of said body cavities, light pervious closure panels attached over each body cavity, space air supply and exhaust means mounted on first ones of said fixture bodies, others of said fixture bodies being free of space air supply and exhaust means, said closure panels for said first ones of said fixture bodies having a substantially uniform color appearance relative to said closure panels for said others of said fixture bodies, and cold spotting means mounted in said body cavities of said other of said fixture bodies in engagement with a local area on said lamps therein for withdrawing lamp heat at said local area, whereby said closure panels for said others of said fixture bodies substantially color match the first closure panels for said first ones of said fixture bodies.

References Cited by the Examiner
UNITED STATES PATENTS

| | | | |
|---|---|---|---|
| 3,010,378 | 11/1961 | Geocaris | 98—40 |
| 3,012,133 | 12/1961 | Archer | 98—40 |
| 3,035,419 | 5/1962 | Wigert | 240—4.7 |
| 3,103,156 | 9/1963 | Quin | 98—40 |
| 3,117,509 | 1/1964 | Archer | 98—40 |

MEYER PERLIN, *Primary Examiner.*

JOHN F. O'CONNOR, *Examiner.*